Figure 1:
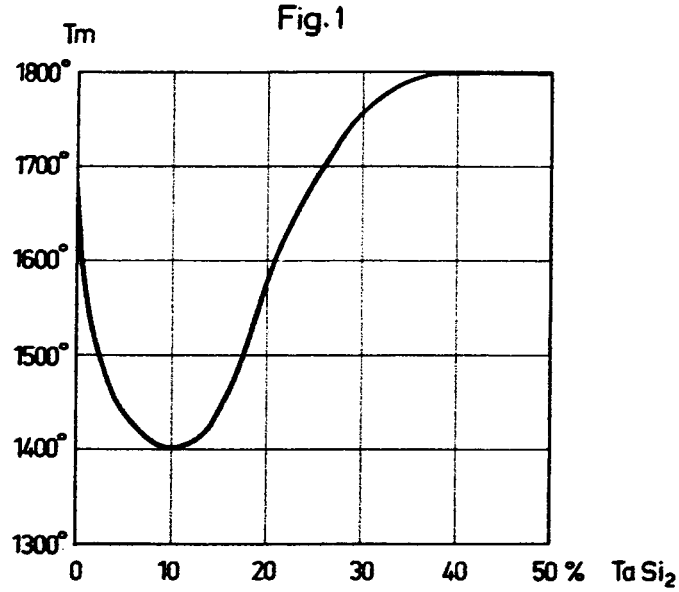

United States Patent Office 3,036,017
Patented May 22, 1962

3,036,017
HEAT RESISTANT AND OXIDATION
PROOF MATERIALS
Nils Gustav Schrewelius, Hallstahammar, Sweden, assignor to Aktiebolaget Kanthal, Hallstahammar, Sweden
Original application June 3, 1954, Ser. No. 432,124. Divided and this application Apr. 13, 1959, Ser. No. 806,178
5 Claims. (Cl. 252—516)

The present invention relates to powder-metallurgically produced materials of the class essentially comprising silicides.

Some of the transition elements of the fourth, fifth and sixth groups in the periodic system of chemical elements possess high melting points, high hardness and good resistance to corrosion. In particular, the excellent resistance to oxidation at high temperatures inherent in silicides has, of late years, gained an increased interest. Thus, for instance, Fitzer ("Berg- und Hüttenmännische Monatshefte," 1952) und Kieffer et al. ("Metall," 1952) report that the silicides of, inter alia, Mo, W, Cr and Ta possess good permanence against oxidation up to 1700° C. The production of objects for practical use from such silicides may be carried out in accordance with conventional powder-metallurgical methods. The principal weakness involved in such products resides in the brittleness characteristic of intermediate phases. From the point of view of mechanical strength silicides are to be considered as comparable with ceramics, and as such they are thus in lack of plastical ductility at room temperature, but possess a softening temperature characteristic of each compound of the class and being in respect of, for instance, $MoSi_2$ about 1500° C. At this temperature the silicide will have imparted to it a certain degree of softness rendering the same susceptible to a slight degree of plastical shaping. The grain growth occurring in the silicide at this temperature will give rise to a brittleness which makes impossible any further plastical shaping.

The mechanical strength of products made from silicides may be improved by adding various metals. It is true that bodies built up from silicide grains cemented together by particles of a more fusible metallic material in a manner similar to the production of hard metal carbides may possess higher degrees of mechanical strength than that of pure silicide, but the permanence against oxidation of such compositions has been found to decrease to an extent which makes the same practically unusable at high temperatures. Several such bonding additions have been tested but have given unsatisfactory results.

Further, it has been proposed to add ceramics powder-metallurgically to silicides. This has been found to involve great difficulties due to undesirable reactions between the silicides and the ceramic additions and also due to the fact that the porosity of the resulting compositions will often be too high. Since the rate of oxidation of any given material may be considered to be proportional to the exposed surface area of the material, and since even a very moderate number of pores in communication with the ambient atmosphere involve a very great increase of the oxidizable surface area, the oxygen attacks will proceed more quickly on a porous composition than on one free from pores since, in the latter case, only the external surface will be subjected to the action of the oxygen. The mechanical strength will also be reduced by porosity.

In cases where compositions from silicides and ceramic additions are to be used as electrical resistance elements, a further problem arises, viz. that of controlling the electrical resistivity (or conductivity) and its coefficient. It will be seen that the electrical conductivity of a composition consisting of a metallic conducting material and an insulator will decrease as the proportion thereof formed by the insulator is increased. At an insulator content of about 70% to 80% by volume the composition will cease to be a metallic conductor because the direct contact between the electrically conducting grains will then be interrupted.

The coefficient of electrical resistivity is dependent, at the relatively lower temperatures, on the metallic component, but at the relatively higher temperatures at which most ceramics possess a certain degree of electrical conductivity, these conditions will be different. Therefore, in the case of a silicide plus ceramic it will occur that the conductivity of the composition at the lower temperatures will be determined essentially by the conductivity of the silicide, while at temperatures above 800° C. to 1000° C. the influence of the ceramic component will be greater and greater. This may result in that, at certain temperatures, the electrical conductivity will present maxima and minima which involves great difficulties in the practical employment of such resistance elements because the control devices will necessarily have to be rather complicated.

In cases where compositions of silicides and other substances are to be used as heat-resistant structural material, for instance, for blades and other structures in gas turbine power plants, in addition to high strength at the operating temperatures involved, satisfactory resistance to heat-shocks and a certain degree of tenacity at both low and high temperatures are also aimed at. Since the silicides like most other materials are subject to grain growth at high temperatures, and this is, as a rule, accompanied by an increased brittleness, this grain growth must be counter-acted, and this may be made, as is well known, by adding materials which by adopting suitable production processes will be present at the limits of the range of grain sizes. Attempts to combine silicides with oxides have often aimed at the obtainment of such a grain growth checking effect. However, an addition of oxides will impair the thermal conductivity of the material which in its turn means reduced resistance to heat-shocks. Such compositions of silicides and oxides, in spite of the high values of their tensile and compressive strengths, display an increased brittleness, especially at the relatively lower temperatures.

It has been found by the applicant that many of the difficulties and inconveniencies enumerated in the foregoing may be eliminated by adding to the silicides, in a powder-metallurgical process, a suitable amount of silicon carbide of a suitable grain size. As a matter of fact, it has been found, quite unexpectedly, that an admixture of silicon carbide into a silicide or a mixed silicide results in a heat-resistant material of highly improved characteristics. By a mixed silicide is meant in this connection a mixture or a solid solution of, or a chemical compound of silicides. Thus it has been found by the applicant that materials of a reduced brittleness at both room temperature and elevated temperatures, and displaying high resistance to heat-shocks, may be produced by adding silicon carbide to silicides. The strength at elevated temperatures will also be increased, and the material possesses a certain degree of elasticity also when cold. If the silicon carbide admixed is present in a suitable amount and grain size, the grain growth at elevated temperature will be prevented, and the material will be fairly well suited to be subjected to plastical shaping operations.

Among the silicides capable of being employed, according to the present invention, as components in the novel heat-resistant material, $MoSi_2$ occupies a particular position. A material composed according to the invention of $MoSi_2$ and SiC, as a matter of fact, has been found to possess particularly favourable strength characteristics even at temperatures up to approximately 1400° C. In particular it may be mentioned that its resistance to heat-shocks is extremely high. The mechanical properties of this material, especially its tenacity from room temperature to 1400° C., and its shock-resistance together with an extraordinarily high permanence against corrosion, make it probable that the same could find use for blades etc. in gas turbines, especially of the jet reaction type. The material may also be expected to find use as an abrasive owing to the fact that, in addition to the characteristics above referred to, it possesses a very high degree of hardness.

Other silicides capable of being used to advantage in combination with SiC are silicides of the metals W, Cr, Ta, Nb, V, Hf, Zr and Ti, and particularly Ta, Nb, Cr and Ti.

According to a further development of the invention, the characteristics of the heat-resistant material may be modified by adding an oxide or a mixed oxide. In this connection the term "mixed oxide" is intended to include a mixture of oxides or a solid solution of, or chemical compounds of oxides. According to this invention, the mixed oxide may contain oxygen compounds of at least one of the metals Al, Be, Ce, Cr, Hf, Mg, Ti, Si, Zr, Th, Y and other rare earth metals. From these metals, Si, Zr, Be, Al, Th and Ce are those which will mainly come into consideration. In addition to these metals small amounts of others may be added in order to modify or stabilize the oxide, or to alter its electrical or other characteristics. From several points of view a mixed oxide of $ZrO_2$ and $SiO_2$ forming 10% to 60% by volume of the heat resistant material may be advantageous in certain cases. It is seen, however, that the invention is not limited to this range of percentages but includes the admixture of oxides or mixed oxides within the range of from 0.1% to 80% by volume. Such additions of mixed oxides involve changes in the electrical characteristics in that they increase the resistance to electric current, i.e. also the electrical resistivity. In addition, the thermal dependence of the latter resistivity coefficient will change. In certain cases it may be advantageous, by varying the contents of silicon carbide and mixed oxide, respectively, to impart to the heat-resistant material the electrical characteristics aimed at in any particular case. Since, on the other hand, any addition of oxides or mixed oxides will act to impair the durability of the material in respect of both mechanical and thermal shocks, due to the usually low thermal conductivity of the oxides and their brittleness in the cold state, it is of advantage to be able to adjust the additions for modifying the electrical characteristics in such a manner that the impairing influence of the oxides will be compensated for by the improving effect of the silicon carbide. In this way it will be possible to maintain, or even to improve the shock-resistance of the pure silicides in spit of oxidic materials having been introduced therein.

The proportional relation between the contents of silicide and silicon carbide in the heat-resistant material is of essential importance in respect of the characteristics intended to be attained. Since silicide as well as silicon carbide each display very good heat-resistance properties it is to be expected that all materials containing these two main components will display a good heat-resistance. This has also been found to be true. Since even very small contents of silicon carbide will influence the strength characteristics in that the same will act to prevent or retard the grain growth at elevated temperatures, the invention includes additions as low as 0.1% by volume of silicon carbide. It has been found, on the other hand, that moderate amounts of silicide may have the effect of essentially improving, i.e., the resistance of silicon carbide to oxidation at temperatures above 1300° C. Therefore, the invention covers materials with a silicon carbide content of up to 99% by volume. Due to certain difficulties involved in the production of nonporous bodies having a very high content of silicon carbide, the major interest has been directed to materials with lower silicon carbide contents than about 40% by volume. It has been found that, in order to attain ductility, the silicon carbide content should range between 5% to 20% by volume, increased resistance to heat-shocks will only be reached at 10% or higher. The range from 5% to 40% by volume of silicon carbide, therefore, has been subjected to a more thorough investigation. In cases where the material is intended to be capable of withstanding severe stresses, SiC contents ranging between 30% and 50% by volume have given the most favourable results.

According to the invention the mixed silicide may consist of between 20% and 80% by weight of one, at least, of the metals W, Mo, Cr, Ta, Nb, V, Hf, Zr or Ti, together with between 0 and 30% by weight of one, at least, of the metals Al, Be, B, Ca, Ce, Co, Cu, Mg, Fe, Mn or Ni, the latter being added to the end of modifying certain characteristics. In the mixed silicide used the Si content should normally be high in order to render the silicide resistant to oxidation, and the applicant has found that the Si content of the mixed silicides concerned should be at least 10%. At lower contents than this the Si content will not be sufficient to be able to form an adequate protective layer of $SiO_2$ on the grain surfaces. Furthermore, applicant has found that the Si content should not exceed 70% because, at higher Si contents, the melting point will be so low that the mixed silicide will be unusable for practical purposes. As a matter of fact, the melting point of the mixed silicide in its state of equilibrium should be considerably higher than the designed operating temperature of the finished composition, and in any case higher than 1400° C.

Comprised within the scope of the invention are all combinations of the above silicides or mixed silicides with silicon carbide and, in relevant cases, together with oxides or mixed silicides. However, as stated in the foregoing, $MoSi_2$ has a particular interest directed to it owing to the particularly satisfactory results attained with heat-resistant materials containing the same in combination with silicon carbide.

The various characteristics which are essential in respect of a heat-resistant material are, i.e., the following: resistance to corrosion, particularly in respect of oxygen at elevated temperature; high tensile strength up to high temperatures; resistance to heat-shocks, elasticity, resistance to mechanical shocks or impacts (brittleness), softening temperature, ductility when subjected to heat, grain growth and consequent deterioration of its strength when maintained at elevated temperatures for long periods of time. For electrical resistance materials and abrasives further specific characteristics are required, such as in respect of its electrical resistivity and its thermal coefficient, and in respect of hardness.

At low Si contents in compositions of MoSi and SiC the actual densities will fall between 95% and 100% of the theoretically calculated values which proves that the porosity is at most 5%. As the SiC content is increased to about 35 or 40% certain difficulties are met in attaining high densities, by way of example, at an Si content of 45% only 85% of the theoretically calculated density was attained.

The shock-resistance may be tested in several different ways according to the intended practical use of a material. One method which has been practiced is the following: A circular plate having a thickness of 8 millimeters and a diameter of 30 millimeters is heated in a furnace up to 1300 C. for a period of 5 minutes and is then directly quenched in water of room temperature. The procedure is repeated till the plate will crack. A heat-resistant material according to the present invention containing $MoSi_2$ and 40% by volume of SiC was found to withstand 60 cycles of such treatment before the first crack appeared. With a SiC content of 25% by volume the plate stood the test 10 times whilst, for comparison, it may be mentioned that pure $MoSi_2$ cracked after 2 cycles of the test. The shock-resistance is not only dependent on the amount of SiC but also of the grain size distribution.

In a so-called "stiffness tester" a cylindrical rod 50 millimeters in length and 4 millimeters in diameter was tested. A material containing 40% by volume of SiC burst at a bending load of 15 kilograms per sq. millimeter and immediately before its bursting displayed an elastic flexing of 2.7 millimeters at its free extremity. For comparison may be mentioned that pure $MoSi_2$ has a bending strength of the same order, its elastic flexing being, however, unnoticeable, or less than 0.1 millimeter.

A direct consequence of the elasticity of the compositions provided by the present invention will be the one that these materials will not display the brittleness in cold state which is characteristic of silicides and similar materials. A series of practical tests made have shown that the materials of the present invention possess a remarkably high degree of tenacity at all temperatures ranging from room temperature up to the vicinity of the melting point.

A test body 12 millimeters in diameter was subjected to a total pressure of 40 kilogram forces through the medium of a graphite rod which was pressed against the top surface of the test body. The temperature was gently raised and the movement of the rod was observed as a function of the temperatures. At 1715° C. the test body softened and was squeezed under the pressure. The test body contained 40% by volume of silicon carbide in addition to $MoSi_2$. For comparison may be mentioned that pure $MoSi_2$ commences to soften already below 1600° C. Thus it will be seen that silicon carbide will impart an increased heat-resistance to silicides.

Of the two components: the silicide and the silicon carbide, the latter is the more oxidation sensitive one, and, in consequence, it has been found that the heat-resistant material according to the invention has less permanence against oxidation than has pure silicide material. However, the resistance of the composition is better than that of silicon carbide, and it has been found possible, according to the present invention, to produce compositions capable of withstanding even as high temperatures as 1600° C. for extended periods of time. On a certain occasion it was observed that $MoSi_2$ containing 35% by volume of SiC and formed into a rod 5 millimeters in diameter and used as an electrical resistance element in air was able to withstand 500 hours of operation at an ambient temperature of 1600° C. Another rod of the identical composition could withstand 2000 hours at 1550° C. It is of great importance that the composition should contain as small an amount as possible of impurities of the kind known to impair the oxidation resistance of the silicon carbide present. An increase of the iron content, for instance, from 0.03 to 0.70 percent by weight involves a reduction of the useful life of the rods from 500 to 20 hours at 1600° C. The amount of SiC present in the composition will not essentially influence the resistance to oxidations. The latter will not be influenced by the oxides or mixed oxides contained in the composition, either. On the other hand, the porosity is of great importance. The higher density, the better will be the resistance.

In accordance with what would be expected, compositions of $MoSi_2$ and SiC will possess an electrical conductivity at elevated temperatures which averages those of the pure substances per se. Compositions containing almost pure $MoSi_2$ have a resistivity characteristic which rises fairly uniformly from about 30 microns per centimeter at room temperature to about 300 at 1600° C. With progressively increased SiC contents the resistance will increase, and at about 40% by volume of SiC a marked maximum will be observed at about 800° C. This maximum will be maintained for increasing SiC contents, and in addition thereto a minimum will be observed at about 1100° C., followed by a continued uniform resistance increase up to the highest temperatures applicable, about 1600° C. At very high SiC contents the resistance characteristic approaches more and more closely that obtained for pure SiC. Apart from the existence of a maximum and a minimum the characteristic curve of a composition containing, for example, 40% by volume SiC will display a total increase in resistance of 350% ranging from room temperature to 1600° C. Pure $MoSi_2$ presents an increase of 900%.

Heat-resistant materials according to the invention may be produced in accordance with conventional powder-metallurgical practice. The pressure sintering method is well suited for application in the production of compositions of silicides and silicon carbides. Especially at high silicon carbide contents, and if low porosity is aimed at, the pressure sintering method will give superior results. Where the production compositions of SiC and $MoSi_2$ is concerned, a temperature of 1700° C. and a pressure of 100 to 200 kilogram forces per sq. centimeter are suitable operating values. For higher contents of SiC than 60% by volume the operating temperature and pressure will have to be further increased in order to obtain products having low porosity; this, however, involves danger of decomposition of the silicide component.

At lower SiC contents than 30% by volume a high density is attainable by cold pressing and thereafter sintering in an atmosphere of hydrogen or rare gases, or in vacuum. A pressing force of 4 ton-forces per sq. centimeter resulted in a product having a density of 92%. For the production of rods or other elongated objects of uniform cross-section throughout their lengths extrusion pressing methods may be resorted to. A mass of silicide and silicon carbide is mixed with about 15% by weight of a temporary binder and is extruded from a press having a die of the desired configuration. The binder is expelled at a comparatively low temperature, and the sintering operation is then completed in a protective gaseous atmosphere or under vacuum.

The $SiO_2$ film present on the silicon carbide particles has a certain influence on the attainment of a low porosity. Both the silicides and the carbide present will always form such a film the thickness of which may range from a few hundreds of A.U. to several hundreds of a millimeter. It is well-known in the art that particles covered with surface films of the identical kind are capable of "wetting" each other when used in powder-metallurgical sintering reactions. It is possible, by a controlled and well-defined pre-oxidation or an oxidation brought about during the sintering procedure, to establish a sintering-promoting silicon dioxide layer of suitable thickness on the surfaces of the components to thereby attain low porosity and improved characteristics. To the same end, it may be of advantage if oxides or mixed oxides contained in the composition contain silicon dioxide which will also facilitate the "wetting" property and contribute to the attainment of a low-porosity material. The mixed oxide, in this case, should contain 1% by weight of $SiO_2$, at least, but the same might also consist almost exclusively of $SiO_2$. It would also be convenient in certain cases to admix particularly finely granulated $SiO_2$; it would be possible also to allow $SiO_2$ to form before, or in the course of, the sintering procedure, such as through an oxidation of silicious materials.

It is essential in order to obtain the optimum in respect of mechanical and other characteristics, that the components of the heat-resistant material according to the invention have suitable grain sizes. It is possible, in the same way as sintered hard metals of the class WC-Co are built up by a skeleton of tungsten carbide kept together by more easily fusible cobalt, to build up compositions according to this invention by a silicon carbide skeleton with a silicide as the binder. The mechanical strength of such a structure is dependent directly on the grain size of the silicon carbide used. In a manner well-known in the art of ceramics, minimum pore space is attainable within the carbide skeleton by intermixing carbide of different grain sizes varying within relatively wide limits. Practical experiments have shown that the use of three specific grain size classes is preferable, viz. 60 to 120 mesh, 200 to 280 mesh and dust of about 1000 to 1200 mesh. A minimum of porosity was attained with 50 to 70% by weight of coarse grained, 0 to 20% by weight of medium grained and 10 to 40% by weight of dusty material. The most favourable amounts will depend to some degree on the total amount of SiC, and also on the intended field of application. At an SiC content of 40% by volume, it was found that 60% by weight of the coarse material, 15% by weight of the medium fineness and 25% by weight of the dustry material resulted in superior mechanical strength. Also the grain size of the silicide used will influence the final result. Excessively coarse material will obstruct the formation of low porosity whilst, on the other hand, excessively finely divided material involves the drawback of rendering the silicide too sensible to oxidation during the sintering process. Practical experiments have shown that it is preferable to use a silicide of an average grain size of about 10 mu. If it is desired to produce a material of optimum heat-ductility it has been found to be preferable to use a silicon carbide of a grain size of 1200 mesh and in amounts ranging from 3 to 15% by weight. Such silicon carbide is able effectively to prevent grain growth in the silicide used and to regard the increasing brittleness at elevated temperatures.

EXAMPLE I 50 parts by volume of $MoSi_2$ of an average grain size of 19 mu was mixed with 50 parts by volume of silicon carbide having a grain size distribution of: 60% by weight of 60 to 120 mesh, 15% by weight of 240 mesh and 25% by weight of 1200 mesh, and the mixture was pressure sintered in a graphite mould at 1720° C. and 200 kilogram forces per sq. millimeter during 8 minutes. The porosity of the resulting heat-resistant material was 4%. A moulded test plate was found to withstand 85 shock cycles within the range from 1250° C. to room temperature. The effective life of a rod 5 millimeters in diameter in air at 1550° C. was 2200 hours.

EXAMPLE II

A solid solution of 15% by weight of $TaSi_2$ in $MoSi_2$ was mixed with 15% its own weight of each of silicon carbide of a fine grade (600 mesh) and zirconium silicate having a grain size of 5 mu. The mass was ground for 72 hours in a ball mill operating with balls made of sintered hard metal, and was then mixed in a kneader with a temporary binder preparatory to its extrusion into tubular form. Such tubes were heat treated during 8 hours at a temperature adapted to driving of the binder, and were then sintered for 2 hours at 1650° C. in pure gaseous hydrogen.

EXAMLE III

A silicide containing 40% by weight of chromium, the remainder being silicon, was mixed and ground with 45% by weight of silicon carbide and was then compressed and sintered under vacuum at 1580° C. The resulting material was crushed and sieved and was used as the abrasive in ceramic-bound or in synthetic-resin-bound grinding wheels.

EXAMPLE IV

A mixture of 95 parts by weight of molybdenum-tantalum-silicide containing 5 atoms percent of $TaSi_2$, and 5 parts by weight of silicon carbide of the grain size class 1000 to 1200 mesh, was ground in a sintered hard metal ball mill for 60 hours. The mass was admixed with an organic lubricant in a small amount, such as ½ percent, and was pressed into rods at a pressure of 2 ton-forces per sq. centimeter. Sintering in gaseous hydrogen at 1700° C. during 30 minutes resulted in a product having a porosity of 5% and a ductility sufficiently good to enable the material to be shaped into helices at a temperature of 1550° C.

According to a further embodiment of the invention the mainly characterising feature of the material resides in that a major proportion of the mixed silicides is constituted by molybdenum silicide and tantalum silicide.

A material of the composition referred to has been found to possess characteristics of a capacity rendering the material excellently well suited for use as heat resistant material in structures where a high mechanical strength when subjected to heat as well as a high resistance to oxidation at high temperatures are required, such as, for instance, in gas turbine power plants.

Furthermore, it has been found by the applicant that a material composed in accordance with this invention may be employed, to great advantage, as an electric resistance material for high temperatures, owing to its high fusion temperature, its resistance to oxidation, its suitable coefficient of electrical resistivity and the relative constancy of its resistivity.

The material of the invention, in addition, has been found to be moldable under heat whereby it is readily formed into helices, folded strips or the like so that the material will be particularly adapted for use as heating elements in electrical furnaces and other electrical heating apparatus.

In the course of researches and investigations carried out in connection with the development of the present invention it has also been possible to establish that molybdenum silicides and tantalum silicides, and particularly molybdenum disilicide, $MoSi_2$, and tantalum disilicide, $TaSi_2$, are capable of forming a solid solution. The crystal structure of pure tantalum silicide will then be maintained up to a solution containing about 60% by weight of molybdenum disilicide and 40% by weight of tantalum disilicide. The crystal lattice of this silicide mixture is slightly smaller than that of pure tantalum disilicide. Thus by measurement the hexagonal crystal axes were found to be: $a=4.66$ A. and $c=6.48$ A., the corresponding values for pure tantalum disilicide being: $a=4.77$ A. and $c=6.55$ A.

As already stated in the foregoing, the heat resisting properties of the material according to the invention are very advantageous. In fact, the resistance to oxidation of the material is so high that the material is usable at temperatures higher than 1600° centigrade. The highest resistance to oxidation has been obtained with a silicide mixture containing about 60% by weight of $MoSi_2$ and 40% by weight of $TaSi_2$. However, any silicide mixture having a tantalum silicide content exceeding approximately 15% by weight yields a higher resistance to oxidation than molybdenum silicide alone. At a content of 30% by weight of $TaSi_2$ it will be possible to maintain consistently an electric heating element at a temperature of 1750° centigrade whilst $MoSi_2$ alone will only allow the maintenance of a temperature of 1650° centigrade.

The silicide mixture according to the present invention has been found to be consistent also in the presence of moderate, and also in the presence of comparatively large amounts of associated metals such as colombium and vanadium without any discontinuous changes in its properties. When such metals are present the changes involved will primarily be in respect of the electrical characteristics of the material.

However, the resistance to oxidation of the material or alloy according to the present invention has been found to decrease with increasing percentages of colombium and vanadium.

The material is preferably produced power-metallurgically. The physical characteristics of the material of the present invention are dependent, in addition to the chemical composition thereof, on the process adopted for its production, in that the physical properties will depend on the grain size and graduation of the original powders used, on the method of mixing the original powders, and on the processes employed for the shaping.

The degree of porosity of the product in the various stages of the production is of critical importance.

It would be suitable, as a rule, to add a binder, preferably one based on aluminium, to the pulverulent original materials.

Figure 2:
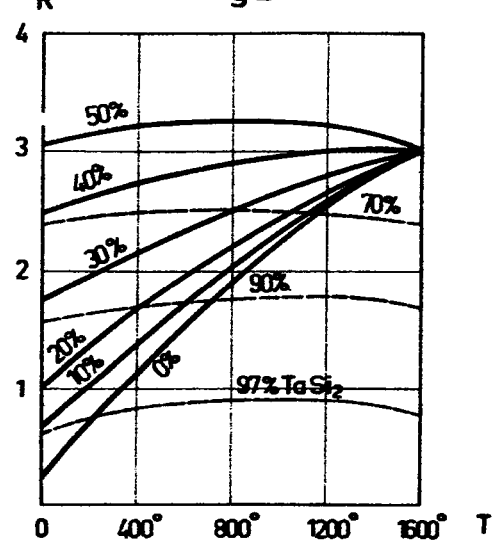
Figure 3:
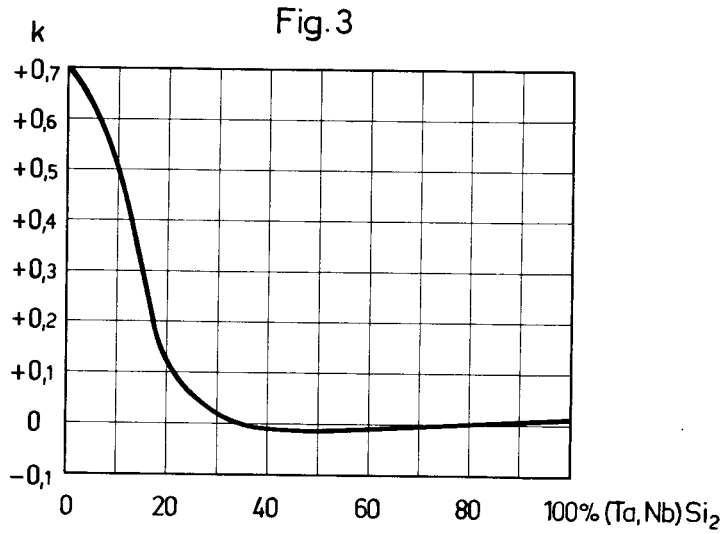
Figure 4:
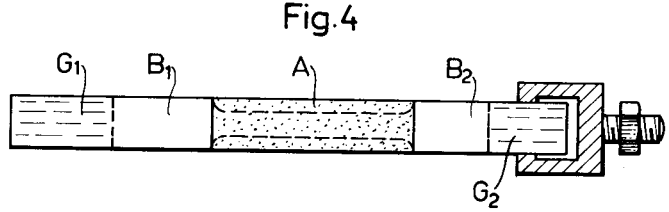
Figure 5:
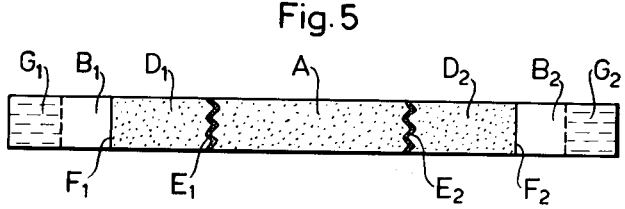
Figure 6:
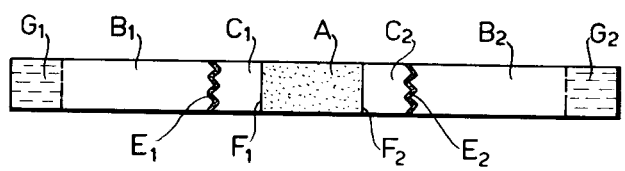

The invention will now be described more in detail, reference being had to the accompanying drawings in which:

FIGS. 1 to 3 are characteristic curves representing the relations between the chemical composition and certain physical properties of the material according to the invention, whilst FIGS. 4, 5 and 6 are diagrammatical representations of electrical heating resistors formed from the material according to the invention.

The heat resistance of the system $MoSi_2$—$TaSi_2$ is represented in the graph of FIG. 1. In this graph only the range from 0 to 50% by weight of $TaSi_2$ has been included since this range is considered to be of a particularly great interest. As will appear from the curve, the softening temperature, i.e. the temperature at which a test bar will just flex under a test load, will initially decrease rapidly when the amount of $TaSi_2$ is increased. At approximatively 10% by weight of $TaSi_2$ the softening temperature is so low as to enable the silicide mixture, being suitably produced in the form of a wire or strip, to be bent and shaped already at 1500° centigrade. The softening temperature of the material may be modified also otherwise than by altering the basic composition of the material, for instance by various kinds of sintering, possibly in two or more steps. The possibility of plastical shaping under heat is of great technical importance, particularly when the production of helices, folded strips or the like intended to be used as electrical heating resistors is concerned. On the other hand, according to the graph, the inclusion of higher percentages by weight of $TaSi_2$ than 25 will cause the softening temperature of the silicide mixture to be higher than that of $MoSi_2$ alone. The softening temperature then increases as the tantalum content is further increased, and to an extent such as to reach a value as high as approximately 1800° centigrade at a proportion of 40% by weight of $TaSi_2$. This elevated softening temperature has a great technical value, especially when the material is to be used in the production of electrical heating resistors, since it will be possible to use element assemblies without the usual ceramic brickwork supports also at the highest temperatures which the resistance material is able to withstand without rapidly getting oxidized or otherwise destructed.

As previously indicated, the characteristic curve of FIG. 1 is dependent, to a certain extent, on the process adopted for the production of the material or alloy. Referring in this connection to FIG. 2, the set of curves drawn in full illustrates how the electrical resistivity (in ohms/sq. mm./m.) changes with temperature T (in centigrade scale) for a group of mixed silicides of compositions ranging from $MoSi_2$ alone to a mixture containing only about 3% by weight of $MoSi_2$ and 97% by weight of $TaSi_2$. The various curves in the set are denoted by figures indicating the percentage of $TaSi_2$, the remainder being $MoSi_2$. It will be seen from this representation that for mixed silicides having low tantalum content, the resistivity is subject to rapid increase with increasing temperatures. Also the electrical resistance is increased with increasing tantalum contents whereas its sensitivity to temperature variations is reduced, so that at a content of 50% by weight of $TaSi_2$ the curve will be almost parallel to the T-axis. For increasing tantalum contents it will be approximately true that the curve is parallelly displaced towards lower electrical resistance values as indicated by the curve set represented in broken lines.

Referring now to FIG. 3 of the drawings, it will be seen from this representation how the coefficient of electrical resistivity, $k$, varies with the composition of the alloy within the range from +20° C. to 1600° C. (68° F. to 2912° F.). Within a zone where the content of tantalum disilicide is 40% to 70% by weight the coefficient of electrical resistivity, $k$, is very slightly negative. The possibility of influencing the thermal sensitivity of the electrical resistance of the alloy according to the present invention involves a great advantage in the art where the alloy is to be employed as an electrical resistance material.

The plasticity at high temperatures obtained upon minor inclusions of $TaSi_2$, compare FIG. 1, is highly dependent on the grain size, but also of the amount of oxides present in the mass. Even a very small content of oxides, usually $SiO_2$, will not only affect the sintering process proper in that a lower degree of porosity will be attained, but will entrain the additional effect that a portion of the tantalum silicide added will react with the silica causing the formation of a ceramic product of good heat refractory properties and resistance to oxidation. This product is effective to decelerate the grain growth of the silicides which is of decisive importance in order that the alloy shall be moldable.

It may be worth mentioning that the applicant has succeeded in producing, from very finely divided and suitably pre-oxidized raw materials, a final product containing 5% by weight of $TaSi_2$ and the remainder consisting essentially of $MoSi_2$, except for a minor oxide content, said final product being moldable under heat.

It will be possible technically to utilize the moldability under heat in an intermediate stage of the production of helices or creased thin strips in that the material is first shaped into the form of wires, tubes or strips by being extruded in a plastic state after mixing with temporary binders, after which the material is dried and, after driving off the binder, is suitably pre-sintered in a protective atmosphere at a relatively low temperature, whereby an intermediate product of a low softening temperature will be obtained. The material is then formed under heat into helices or creased strips or into other shapes, as desired. After having carried out this formation to final shape the final sintering is effected in air at a suitable higher temperature such as, for instance, 1600° centigrade, during which operation silica or mixed oxides are formed which will fill up the remaining pores whereby the softening temperature of the material is raised into a final high value.

In the following a few examples will be given of suitable compositions of the material according to the present invention, and indicating also some important characteristic properties of said materials.

*Example 1*

| | Percent by weight |
|---|---|
| $MoSi_2$ | 80 |
| $TaSi_2$ | 6.5 |
| $SiO_2$ | 8.5 |

The remainder consisting of oxides and silicides of V, Al, Fe, Nb, Ni.

CHARACTERISTICS

| | |
|---|---|
| Refractory up to approximately. | 1750° C. |
| Softening temperature after presintering, about | 1420° C. |
| Softening temperatures after final sintering, about | 1700° C. |
| Elec. resistivity at: | |
| 20° C | .6 ohm/sq.mm./meter. |
| 1300° C | 3.3 ohms/sq.mm./meter. |
| 1600° C | 3.8 ohms/sq.mm./meter. |

*Example 2*

| | Percent by weight |
|---|---|
| $MoSi_2$ | 70 |
| $TaSi_2$ | 21 |
| $SiO_2$ | 5 |

The remainder consisting of oxides and silicides of the metals V, Fe, Al, Nb, Ni in the form of impurities and binders.

CHARACTERISTICS

| | |
|---|---|
| Refractory up to | 1750° C. to 1800° C. |
| Softening temperature exceeding | 1700° C. |
| Elec. resistivity at: | |
| 20° C | 1.3 ohms/sq.mm./meter. |
| 1300° C | 3.1 ohms/sq.mm./meter. |
| 1600° C | 3.2 ohms/sq.mm./meter. |

*Example 3*

| | Percent by weight |
|---|---|
| $MoSi_2$ | 65 |
| $TaSi_2$ | 30 |

The remainder consisting of oxides and silicides of the metals Al, Fe, Nb, V and Ni.

CHARACTERISTICS

| | |
|---|---|
| Refractory up to | 1850° C. |
| Softening temperature exceeding | 1700° C. |
| Elec. resistivity at: | |
| 20° C | 1.8 ohms/sq.mm./meter. |
| 1300° C | 3.2 ohms/sq.mm./meter. |
| 1600° C | 3.2 ohms/sq.mm./meter. |

Referring to FIGS. 4 to 6 of the drawing, these figures are illustrative of a few structural forms of electrical heating elements made of the material according to the present invention.

FIG. 4 illustrates a rod of a length of, for example, 20 in. which has been pressed from different original mixtures in such a manner as to obtain an intermediate or central section A of a length of about 4.7 in. and consisting of a material containing 10% by weight of $TaSi_2$, 3% by weight of $VSi_2$ and 87% by weight of $MoSi_2$, whilst the two end sections $C_1$—$B_1$ and $B_2$—$G_2$ of 7.5 in. each consist of pure $MoSi_2$. Since the material of the central section A possesses a higher coefficient of electrical resistivity than does the material of the two end sections, the rod when used as an electric heating element will attain a substantially higher temperature in its central section A than in its end sections. Even greater temperature differences between the central section and the end section is obtainable by the action of reducing the central section A of the rod, for instance by grinding, after the presintering process, so as to impart to this section a cross-sectional area being, for example, only half that of the end sections, whereby, when a current flow is passed through the rod the end sections will attain temperatures of such low values that special arrangements for cooling the end sections can be dispensed with. The central section A may, thermally, be referred to as an "incandescent section" and the end sections may be referred to as "cold sections."

By impregnating the two extreme end sections $G_1$ and $G_2$ with a metal having a high electrical conductance, such as copper, it will be possible to increase the difference in resistivities between the end sections $C_1$, $G_2$, and $B_1$, $B_2$, on one hand, and the central section A, on the other hand, to a degree such as to render it unnecessary to reduce the cross-sectional area of the central section A to an extent which would otherwise be required. The impregnation with, for example, copper, may, to advantage, be carried out by making the sections $G_1$ and $G_2$ wholly or partly absorb metallic copper at a temperature at which this copper is highly liquid, and after wholly or partly completing the final sintering of the material. It has been found to be possible in this way to lower the resistivity of the extreme ends of the rod at 1600° C. from 2.9 ohms/sq. mm./meter to 1.3 ohms/sq. mm./meter. It has also been possible in the manner stated to produce continuous rods of a predetermined required or suitable distribution of its electric resistance per unit length of the rod, and nevertheless to maintain its cross sectional area uniform throughout which is of importance from technical and economical points of view.

According to a further development of the present invention, a combination of different silicide compounds may be obtained by joining, in a pressure sintering process, finely sintered rod selections of different compositions, possibly while using a pulverulent welding material in the joints proper. Said pulverulent material should either be of a composition identical with that of one of the rod sections, or of a composition being a mixture of the pulverulent original materials from which the two different rod sections were produced. The two rod ends may then be abutted and pressed together while increasing the temperature whilst the region of abutment between the same is maintained in a graphite mold suited for the purpose. It is true that this process involves a considerably more costly method of combining silicide compounds of different compositions than that described in conjunction with FIG. 4, however the same may be advantageous where rods of particularly great length are to be produced. Thus, it has been found to be readily possible by the use of this method to produce, for instance (see FIG. 5) a rod of a total length of 47 in. having an incandescent section $D_1$—A—$D_2$ of a length of 31.5 in., and end sections $G_1$—$B_1$ and $B_2$—$G_2$ of a length of 7.9 in. each. Such a rod may be made up of three rod elements, viz. $G_1$—$B_1$—$D_1$, A and $D_2$—$B_2$—$G_2$, each of a length of about 15.75 in. The rod elements are joined together by means of a powder material at the joints or abutment faces $E_1$ and $E_2$. The element A, in the example illustrated in FIG. 5, consists of a uniform compound containing 25% by weight of $TaSi_2$, 70% by weight of $MoSi_2$ and 5% by weight of $NbSi_2$ whilst the two other elements, $G_1$—$B_1$—$D_1$ and $D_2$—$B_2$—$G_2$ are jointed centrally intermediate their ends, at $F_1$, $F_2$, the portions $D_1$ and $D_2$ situated inwardly thereof being of a composition identical with that of the central section A, and the portions $G_1$—$B_1$ and $B_2$—$G_2$ situated outwardly of said joints $F_1$, $F_2$, respectively, consisting of pure $MoSi_2$, which, however, has been impregnated with copper within the extreme end portions $G_1$ and $G_2$. After having carried out the joints $E_1$ and $E_2$ with the first mentioned element A centrally disposed and the two heterogeneous end elements $G_1$—$B_1$—$D_1$ and $D_2$—$B_2$—$G_2$ disposed in a manner to place the copper containing portions $G_1$ and $G_2$ at the extreme ends, a rod will be obtained which when having a uniform cross-sectional area of 0.31 sq. in. and when used as an electrical heating element will attain sufficiently low temperatures at its ends to enable any special cooling arrangements to be dispensed with.

In the embodiment illustrated in FIG. 6 the intermediate rod element is of heterogenous structure having a portion A consisting of a mixture of 25% by weight of $TaSi_2$, 70% by weight of $MoSi_2$ and 5% by weight of $NbSi_2$, and two end portions $C_1$ and $C_2$ consisting of pure $MoSi_2$. The other rod elements are produced so as to have inner portions $B_1$ and $B_2$, respectively, consisting of pure $MoSi_2$ and outer portions $G_1$ and $G_2$, respectively, consisting of $MoSi_2$ impregnated with copper. Thus, in this case the incandescent section is delimited to the portion A, whilst the cold sections $G_1$—$B_1$—$C_1$ and $C_2$—$B_2$—$G_2$ comprise, in addition to the whole of the respective end rod elements, also the adjacent portions of the central rod element. Thus, the joints $E_1$ and $E_2$ interconnecting the rod elements will be situated within the cold sections whilst the "fusion" joints $F_1$ and $F_2$ between the different structural compositions area disposed within the central rod element.

A further advantage from a technical point of view will be attained by choosing for the incandescent section A or $D_1$—A—$D_2$, respectively, and for the cold sections $G_1$—$B_1$, $B_2$—$G_2$ or $G_1$—$B_1$—$C_1$, $C_2$—$B_2$—$G_2$, respectively, a composition such as to cause the coefficient of electrical resistivity to be lower within the cold sections than within the incandescent section. When upon current flow through the element the temperature increases in the incandescent section, heat will also be transferred through the joints $F_1$, $F_2$ into the cold sections. This will also increase the resistance within the cold sections, and in this way, within the portions $B_1$, $B_2$ or $C_1$, $C_2$, respectively, thereof disposed adjacent to the joints $F_1$ and $F_2$, respectively, interconnecting the same with the incandescent section, a continuous temperature gradient will develop having a uniform slope from the temperature of the incandescent section to the temperature of the terminal at $G_1$ and $G_2$, respectively. As in most cases there will prevail a sharp temperature difference between the different materials, the choice of compositions above referred to involves an advantage from the technical point of view in that the rod will not be subjected to any substantial thermal stresses. It has been found by practical tests that a joint between pure $MoSi_2$ and a mixed material containing, for example, 30% by weight of $TaSi_2$, 5% by weight of $NbSi_2$ and 65% by weight of $MoSi_2$ can withstand a temperature of 1650° centigrade for more than 1000 hours.

Thus, to summarize, it will be appreciated that by impregnating the extreme end portions $G_1$ and $G_2$ of the cold sections with copper, the electric conductance of these portions will be increased causing a reduction of the development of heat in said portions upon passing a current therethrough whereby a relative cooling effect is attained. Thus, the rods illustrated in FIGS. 4 to 6 are, in fact, composed of three different kinds of sections, viz. a central incandescent section A, or $D_1$—A—$D_2$, which is sharply delimited relative to two intermediate sections $B_1$, $B_2$ or $B_1$—$C_2$, $C_2$—$B_2$, respectively, of pure $MoSi_2$, and two extreme end sections $G_1$ and $G_2$ containing $MoSi_2$ plus copper. Thus the intermediate sections directly abut the hot incandescent section and, therefore, can be considered as buffers between the incandescent section and the cooler copper containing extreme end sections $G_1$ and $G_2$. The incandescent section, thus will not immediately contact the solid copper conductor which is an essential feature since metallic copper is heat sensitive at high temperatures. The arrangement according to the present invention will ensure, in practical use, that the copper containing portions $G_1$ and $G_2$ will reach a temperature which is at least 200° C. lower than that of the incandescent section.

This application is a division of my abandoned application Serial No. 434,124.

What I claim is:

1. An electric heating resistor having a substantial portion thereof formed from particles consisting essentially of finely divided silicon carbide and a finely divided and evenly distributed metal silicide component, the amount of said silicide component being at least 1% but not more than 60% by volume of said resistor portion and sufficient to lower substantially the resistivity of the resistor, said resistor portion consisting of a rigid skeleton of said silicon carbide particles in direct contact with each other and having voids therebetween, said voids being substantially filled with said metal silicide component leaving a total porosity below 15% by volume of said portion of the heating resistor, said silicide component being constituted of at least one silicide of the group consisting of $MoSi_2$ and $MoSi_3$ in combination with at least one silicide of the group of elements consisting of W, Cr, Ta, Nb, V, Hf, Zr, Ti, Al, Be, B, Ca and Ce, the composition of the silicide component being 10 to 70% by weight of Si, 20 to 80% by weight of Mo, W, Cr, Ta, Nb, V, Hf, Zr and Ti, and up to 30% by weight of Al, Be, B, Ca and Ce, said silicide component containing sufficient $MoSi_2$ so that the silicide component per se resists oxidation for a prolonged time at 1550° C., the silicon carbide content of said portion of said heating resistor being at least 40% and not more than 99% by volume of the solid part of said portion.

2. An electric heating resistor as described in claim 1 in which the average particle size of said silicide component is about 10 microns.

3. An electric heating resistor as described in claim 1 in which said portion has an electrical resistivity characteristic with three ranges, the first such range being from room temperature to about 800° C. in which resistivity rises with temperature, the second such range being from about 800° C. to about 1100° C. in which resistivity falls with rising temperature, and the third such range being from about 1100° C. to about 1600° C. in which resistivity again rises with temperature.

4. An electric heating resistor as described in claim 1 in which the total porosity is not greater than about 8% by volume in said portion.

5. An electric heating resistor as described in claim 4 in which said portion has a silicide component consisting essentially of molybdenum disilicide.

References Cited in the file of this patent

UNITED STATES PATENTS

| | | |
|---|---|---|
| 2,150,167 | Hutchins et al. | Mar. 14, 1939 |
| 2,406,275 | Wejnarth | Aug. 20, 1946 |
| 2,412,373 | Wejnarth | Dec. 10, 1946 |
| 2,412,374 | Wejnarth | Dec. 10, 1946 |
| 2,412,375 | Wejnarth | Dec. 10, 1946 |
| 2,412,376 | Wejnarth | Dec. 10, 1946 |
| 2,445,296 | Wejnarth | July 13, 1948 |
| 2,622,304 | Coffer | Dec. 23, 1952 |
| 2,814,857 | Duckworth | Dec. 3, 1957 |

OTHER REFERENCES

Metall, vol. 6 (1952), pp. 243–250.

UNITED STATES PATENT OFFICE
CERTIFICATE OF CORRECTION

Patent No. 3,036,017                              May 22, 1962

Nils Gustav Schrewelius

It is hereby certified that error appears in the above numbered patent requiring correction and that the said Letters Patent should read as corrected below.

Column 3, line 53, for "spit" read -- spite --; column 12, line 9, for "selections" read -- sections --; line 59, for "other" read -- outer --.

Signed and sealed this 4th day of September 1962.

(SEAL)
Attest:

ERNEST W. SWIDER
Attesting Officer

DAVID L. LADD
Commissioner of Patents